United States Patent
Okubo et al.

(10) Patent No.: US 10,006,723 B2
(45) Date of Patent: Jun. 26, 2018

(54) SEAL STRUCTURE FOR TANK

(71) Applicant: T.RAD Co., Ltd., Tokyo (JP)

(72) Inventors: Atsushi Okubo, Tokyo (JP); Taiji Sakai, Tokyo (JP); Takuya Bungo, Tokyo (JP)

(73) Assignee: T.RAD Co., Ltd., Tokyo (JP)

( * ) Notice: Subject to any disclaimer, the term of this patent is extended or adjusted under 35 U.S.C. 154(b) by 0 days. days.

(21) Appl. No.: 15/124,272

(22) PCT Filed: Feb. 26, 2015

(86) PCT No.: PCT/JP2015/056572
§ 371 (c)(1),
(2) Date: Sep. 7, 2016

(87) PCT Pub. No.: WO2015/133592
PCT Pub. Date: Sep. 11, 2015

(65) Prior Publication Data
US 2017/0016684 A1    Jan. 19, 2017

(30) Foreign Application Priority Data

Mar. 7, 2014 (JP) ................................. 2014-044879

(51) Int. Cl.
| | |
|---|---|
| F28D 7/02 | (2006.01) |
| F28F 9/02 | (2006.01) |
| F16L 25/00 | (2006.01) |
| F28D 7/16 | (2006.01) |
| F28F 1/04 | (2006.01) |

(Continued)

(52) U.S. Cl.
CPC ........ F28F 9/0226 (2013.01); F16L 25/0009 (2013.01); F28D 7/1684 (2013.01); F28D 7/1692 (2013.01); F28F 1/045 (2013.01); F28F 9/001 (2013.01); F28D 9/0037 (2013.01); F28F 2275/122 (2013.01)

(58) Field of Classification Search
CPC .......... F28F 9/0226; F28F 1/045; F28F 9/001; F28D 7/1684; F28D 7/1692; F28D 9/0037; F16L 25/0009; F16L 37/0987; F02B 29/0475
USPC ........................................................ 165/165
See application file for complete search history.

(56) References Cited

U.S. PATENT DOCUMENTS

| | | | |
|---|---|---|---|
| 4,881,595 A | 11/1989 | Damsohn et al. | |
| 2009/0102188 A1* | 4/2009 | Ishiki ................. | F16L 37/0987 285/148.26 |

(Continued)

FOREIGN PATENT DOCUMENTS

| | | |
|---|---|---|
| DE | 4243495 A1 | 6/1994 |
| DE | 10213064 A1 | 11/2004 |

(Continued)

*Primary Examiner* — Davis Hwu
(74) *Attorney, Agent, or Firm* — Norris McLaughlin & Marcus, P.A.

(57) ABSTRACT

In order to improve sealing performance when the open end of a tank is swaged and thereby secured inside an annular groove the surface of which is formed in a substantially rectangular shape with a seal material between the groove an the tank, flange parts protrude in a fan shape at the four corners of the seal material, and those flange parts are pressed by the corner sections of the annular groove, thereby preventing the seal material from moving in the corner sections.

7 Claims, 10 Drawing Sheets

(51) Int. Cl.
*F28F 9/00* (2006.01)
*F28D 9/00* (2006.01)

(56) References Cited

U.S. PATENT DOCUMENTS

| | | |
|---|---|---|
| 2010/0089548 A1 | 4/2010 | Braic et al. |
| 2011/0162826 A1 | 7/2011 | Garret et al. |
| 2012/0285423 A1* | 11/2012 | Nguyen .............. F02B 29/0475 123/542 |

FOREIGN PATENT DOCUMENTS

| | | |
|---|---|---|
| EP | 0372187 A1 | 6/1990 |
| EP | 1921413 A1 | 5/2008 |
| EP | 2458312 A1 | 5/2012 |
| FR | 2875592 A1 | 3/2006 |
| FR | 2968753 A1 | 6/2012 |
| GB | 1313904 | 4/1973 |
| JP | 61-141593 U | 9/1986 |
| JP | 2004066283 A | 3/2004 |
| JP | 2006250413 A | 9/2006 |
| JP | 2008-275244 A | 11/2008 |
| JP | 2011163642 A | 8/2011 |
| WO | 2010/003807 A1 | 1/2010 |

* cited by examiner

SEAL STRUCTURE FOR TANK

BACKGROUND OF THE INVENTION

The present invention relates to a structure for connection between a tank and a casing of a heat exchanger configured to allow the casing to cover an outer periphery of a core formed by laminating flat tubes.

Japanese Patent Laid-Open No. 2011-163642 discloses a heat exchanger in which the core is formed by laminating flat tubes, and the casing is fitted onto the outer periphery of the core so that the tank is secured to both end parts of the casing by brazing.

Japanese Patent Laid-Open No. 2004-66283 and Japanese Patent Laid-Open No. 2006-250413 disclose a heat exchanger configured by a structure connecting the tank and the core through swaging.

SUMMARY OF INVENTION

The heat exchanger as disclosed in Japanese Patent Laid-Open No. 2011-163642 is configured by laminating the flat tubes each having both ends expanded to form a core, a cylindrical casing having a rectangular cross section fitted onto an outer periphery of the core, and brazing ends of the tank to both end parts of the casing.

As the alternative to the brazing process, a swaged structure having the tank and the casing as disclosed Japanese Patent Laid-Open No. 2004-66283 and Japanese Patent Laid-Open No. 2006-250413 may be considered. Then it needs a tube plate. Furthermore, an annular protrusion is formed on the outer periphery of the casing, which may impair compactness as well as complicate the molding process.

The object of the present invention is to provide a seal structure for a tank having a simple structure and excellent sealing performance.

The present invention according to a first aspect thereof is a seal structure for a tank including:
a core (2) formed from a lamination of a large number of flat tubes (1) where a cross section of an outer periphery at an end part is formed into a rectangular shape;
a casing (3) fitted onto the outer periphery of the core (2), having a rectangular opening at the end part;
a tank receiver (9) positioned in alignment with an inner periphery of the open end part of the casing (3), formed in a planar frame shape and crank-like in cross section;
an annular groove (4) formed between the tank receiver (9) and the casing (3); and
a tank (6) having an end part press fitted inside the annular groove (4) with a seal material (5), having an outer periphery swaged and thereby secured.

The present invention according to a second aspect thereof is the seal structure for the tank according to the first aspect, wherein:
a large number of concave parts (20) are arranged in parallel like windows in the outer periphery of the tank (6), and slits (10) are formed in an outer periphery of the open end part of the casing (3) at predetermined intervals wherein the open end sides are pressed from the slits (10) of the casing (3) to the concave parts (20) in parallel; and wherein the outer periphery of the tank (6) is swaged and thereby secured.

The present invention according to a third aspect thereof is the seal structure for the tank according to the first or second aspect, wherein:

the annular groove (4) has corner sections (7) each being made wider than other parts, and curved to have an arc shape at four corners each having a substantially rectangular shape;
the seal material (5) has
a pair of short-side parts (5a),
a pair of long-side parts (5b) in parallel with each other, base parts (5c) circular in cross section, formed at the four corners, and
flange parts (8) each having a planar fan-like shape, integrally formed with the long-side parts, the flange parts (8) protruded outward of the respective four corners;
the seal material (5) is configured to fit the base parts (5c) and the flange parts (8) inside the annular groove (4) at the four corners; and
the tank (6) is press fitted inside the annular groove (4) of the casing (3) with the seal material (5), which is swaged and thereby secured.

The present invention according to a fourth aspect thereof is the seal structure for the tank according to the third aspect, wherein:
the tank (6) is swaged and thereby secured from outside the casing (3) except the corner sections (7) of the annular groove (4) of the casing (3).

The present invention according to a fifth aspect thereof is the seal structure for the tank according to the third aspect, wherein:
the tank (6) is swaged and thereby secured to the annular groove (4) from outside the casing (3) by bending a large number of hooks formed on the casing (3) at right angles directed to the tank (6) side.

In the present invention according to the first aspect, the rectangular core 2 constituted as a plurality of laminated flat tubes 1 is fitted onto the casing 3, and the tank receiver 9 having a planar frame shape and a crank-shape in cross section is disposed in the inner periphery of the open end part of the casing 3. And the tank 6 is swaged and thereby secured inside the annular groove 4 formed between the tank receiver 9 and the casing 3 with the seal material; the resultant seal structure, therefore, becomes compact and simple.

In the present invention according to the second aspect, and in the above configuration,
a large number of concave parts 20 are arranged in parallel like windows in the outer periphery of the tank 6,
slits 10 are formed in the open end part of the casing 3 at the outer periphery at predetermined intervals, and
the open ends are pushed to the concave parts 20 in parallel from the slits 10, where the tank 6 is swaged and thereby secured.

The resultant seal structure, therefore, is simplified with high strength.

In the present invention according to the third aspect, and in the above configuration, the seal structure for the tank is that, flange parts 8 each integrally formed with the base part 5c,
protruding from four corners of the seal material 5 having a substantially rectangular planar shape,
and fitted inside the respective corner sections 7 of the annular groove 4 together with the base parts 5c.

The present invention provides the flange parts 8 at four corners of the seal material 5, respectively, to prevent movement of the seal material 5 around the four corners, respectively, to ensure excellent sealing performance.

In the above configuration, as described in the fourth aspect, the process for caulking and securing the tank 6 to the casing 3 except the corner sections 7 of the annular groove 4 of the casing 3 provides the tank fixing structure with an easy caulking process and high sealing effect.

In the above configuration as described in claim 5, where the tank is secured by bending a large number of hooks formed on the casing 3 at right angles to the tank 6 side, this is effected by easy swaging.

BRIEF DESCRIPTION OF DRAWINGS

FIG. 4 represents the procedure of assembling the seal structure, showing the procedure of assembling the seal structure in a view taken along line IV-IV of FIG. 3, wherein FIG. 4(A) shows a state before assembling, and FIG. 4(B) shows a state after assembling.

FIGS. 7(A)-7(D) represent the seal material 5 used for a second embodiment of the seal structure of the present invention, wherein

DETAILED DESCRIPTION OF THE INVENTION EXAMPLE 1

Next, embodiments of the present invention will be described referring to the drawings.

Figure 1:
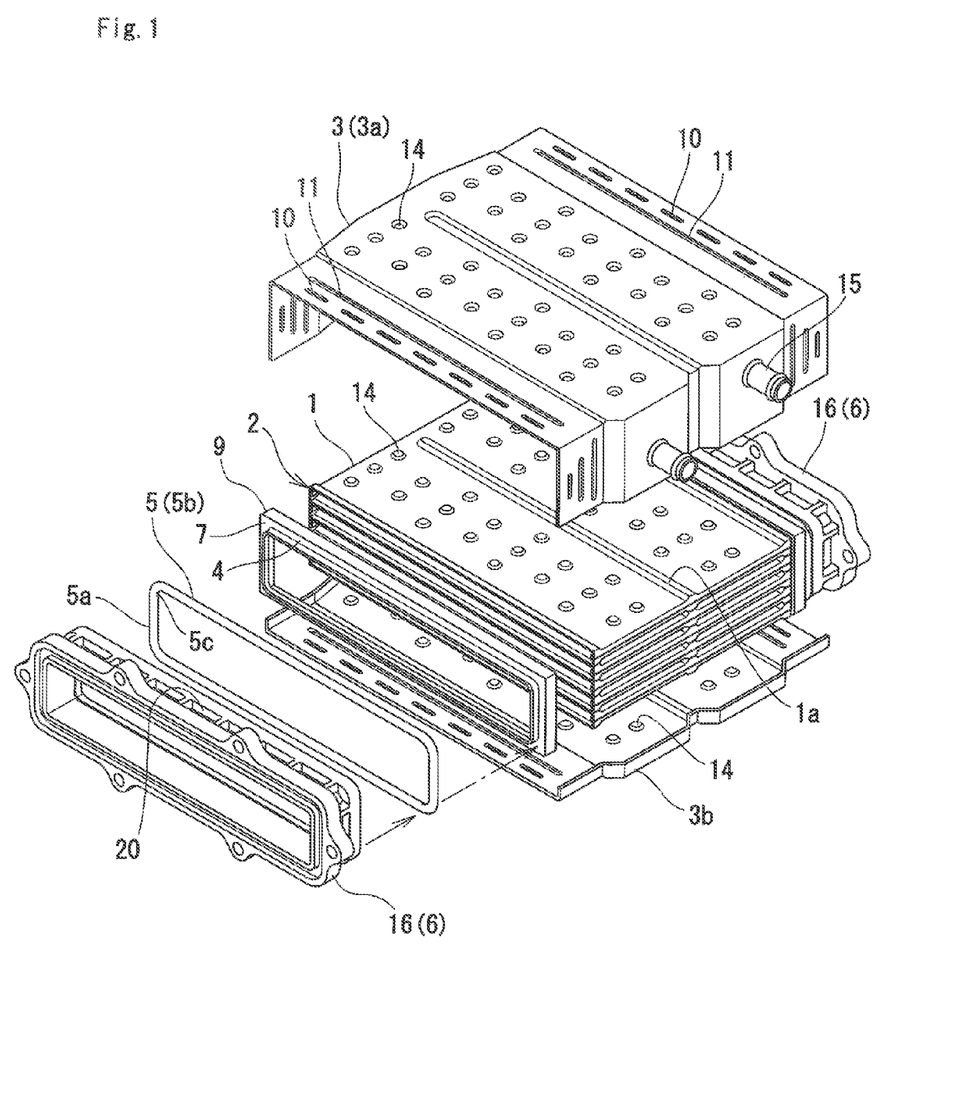
FIG. 1 is an exploded perspective view of a seal structure for the tank of the present invention.
Figure 2:
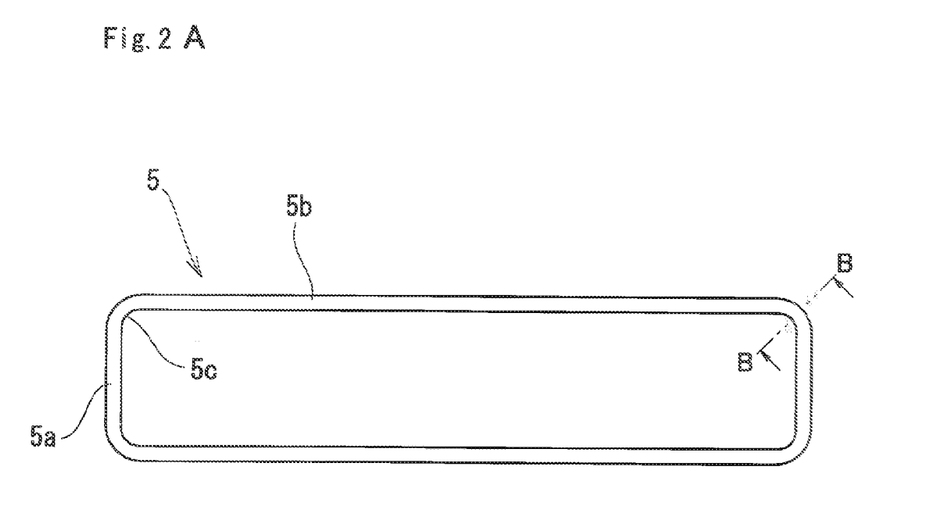
FIG. 2(A) is a plan view of a seal material 5 used for the seal structure.
FIG. 2(B) is a sectional view taken along line B-B of FIG. 2(A).

The seal structure for a tank of the example is configured by laminating a large number of flat tubes 1 to form a core 2, an outer periphery of which is fitted with a casing 3 as shown in FIGS. 1 and 2. Then, a tank receiver 9 is disposed to an inner side of the open end of the casing 3. The tank receiver 9, has:

its outer periphery bent into an outer frame conforming to the inner periphery of the open end part of the casing 3;

its inner periphery subjected to burring process to be raised into the inner frame shape, and;

its whole plane having a frame-like surface in a plane vision, and a crank-shape in cross section.

An annular groove 4 is formed between the tank receiver 9 and the casing 3. Then, the seal material 5 as shown in FIGS. 1 and 2 is fitted with the annular groove 4, and one end of the tank 6 is swaged and thereby secured to the casing 3 with the seal material 5.

The flat tube 1 which constitutes the core 2 is configured by fitting a pair of upper and lower groove-like plates.

Both open end parts of the flat tube 1 are expanded in the thickness direction to form expanded parts 1b. A partition 1a is disposed at the center of the outer surface of the flat tube while protruding outward, for the purpose of allowing the liquid to make a U-turn. The height of the partition 1a is the same as that of the expanded part 1b. As shown in FIG. 1, the flat tube 1 has a large number of outwardly protruding dimples 14.

The flat tubes 1 are laminated, keeping each of the expanded part 1b and the partition 1a in contact with, to form the core 2.

The outer periphery of the core 2 is formed into a rectangular shape, and the outer periphery thereof fitted with the casing 3. The casing 3 comprises a casing body 3a formed into a groove-like shape, and a lid member 3b to block up between side walls. The side wall of the casing body 3a has a pair of protruding pipes 15.

The partition 1a and the dimples 14 may not be formed in some situation. When the partition 1a is not disposed, it is laminated such that the expanded parts 1b are in contact with each another, to form the core 2.

A large number of slits 10 are formed along the end part of the casing 3 at predetermined intervals.

Figure 3:
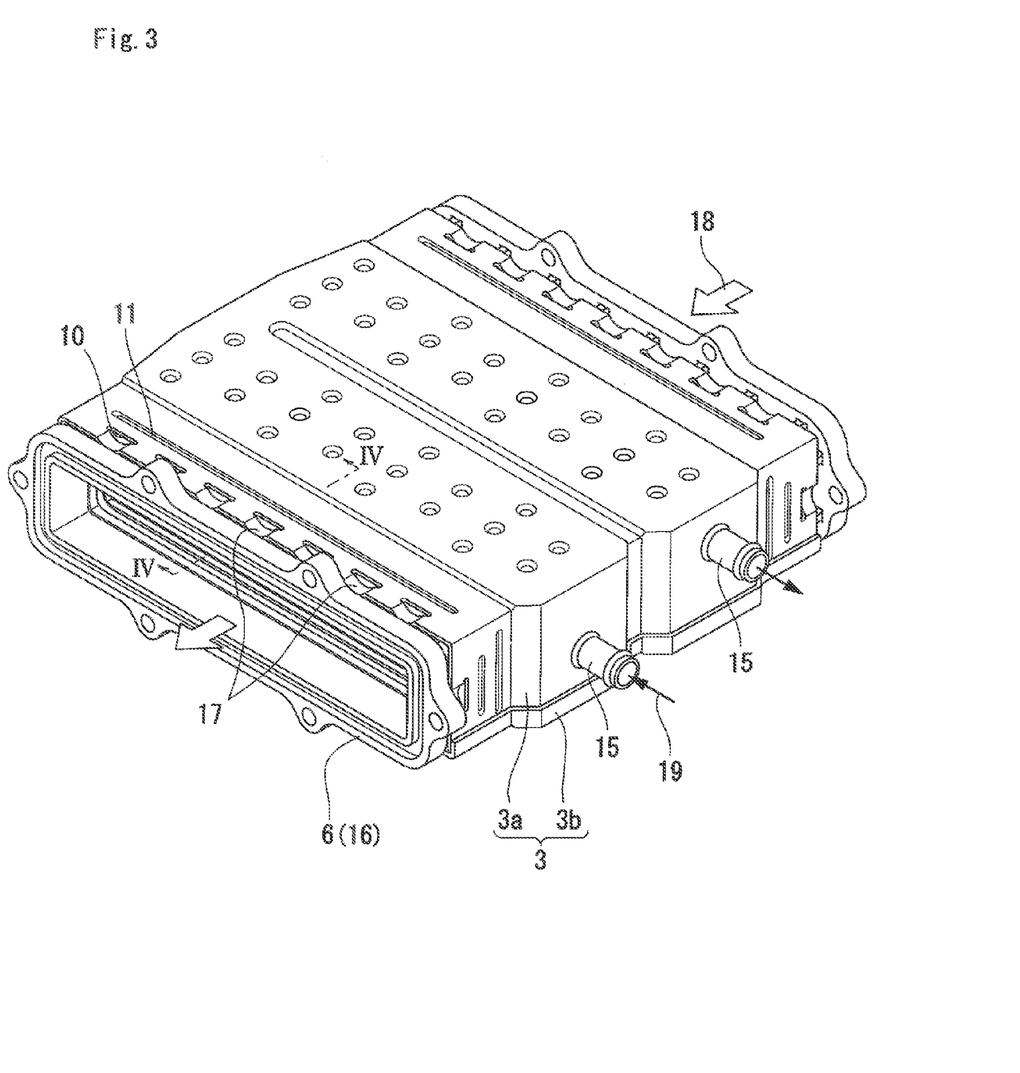
FIG. 3 is a perspective view showing a constructing state of the same.
Figure 4:
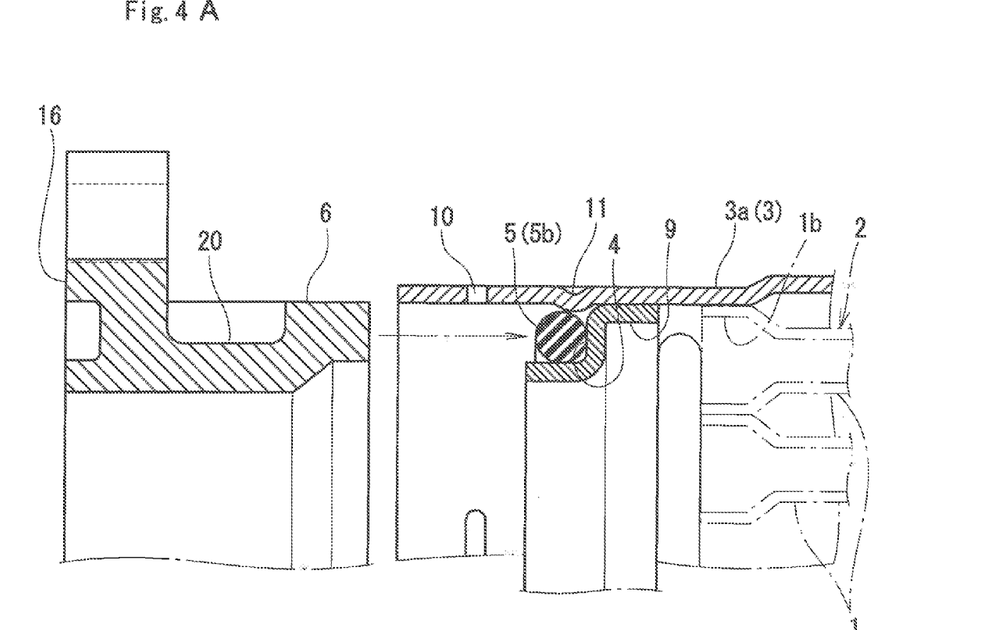
Figure 5:
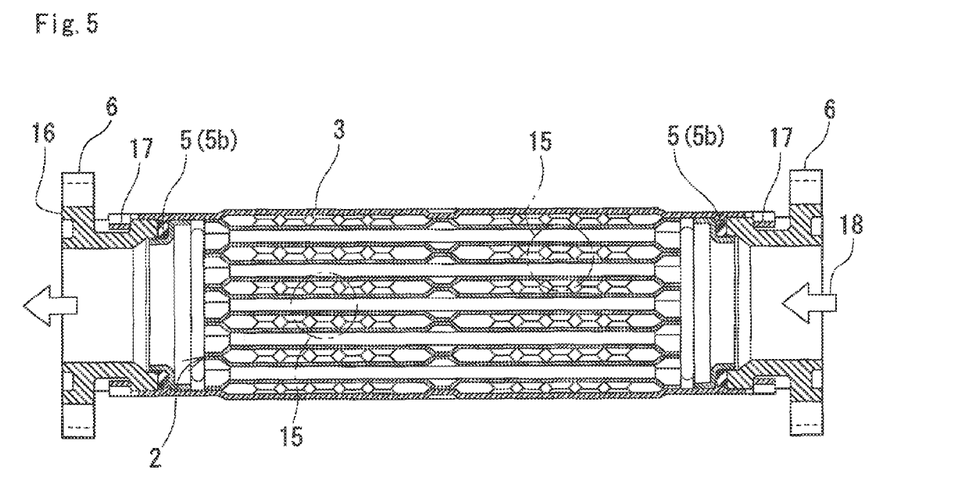
FIG. 5 is a vertical sectional view of the same.
Figure 6:
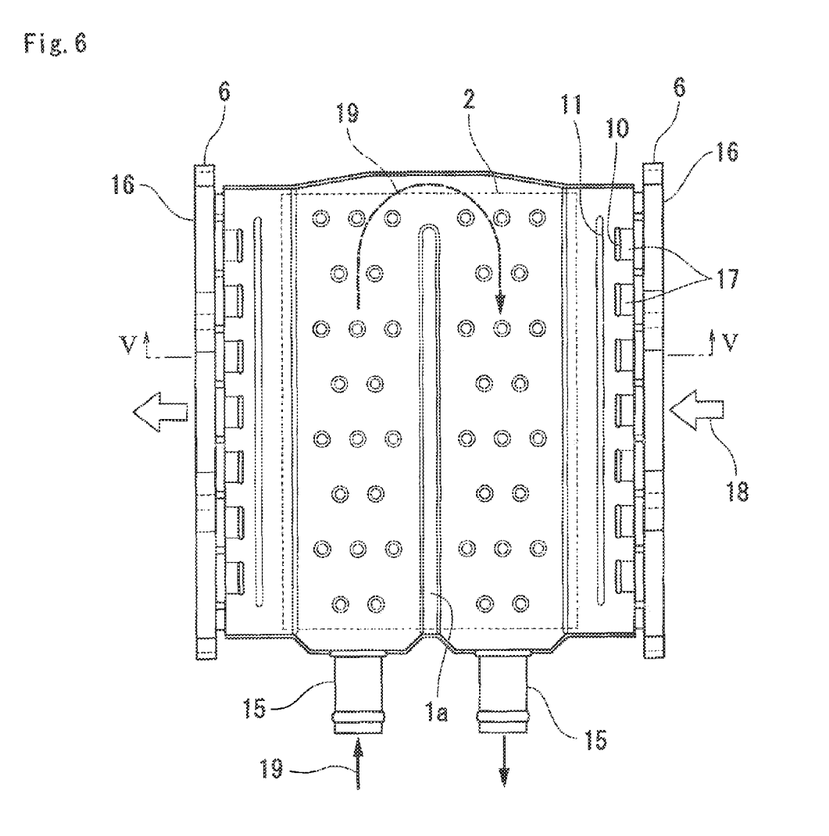
FIG. 6 is a plan view of the seal structure.

As shown in FIG. 3, the leading ends of the casing 3 from the slits 10 are recessed to form swaged parts 17 in parallel with the side wall of the tank 6. Note that, adjacent to the slits 10, a straight convex line 11 is formed projecting inward, in the outer periphery of the casing 3. Then, the seal material 5 is press fitted between a leading end of the tank 6 and the convex line 11 as shown in FIG. 4(B).

In this example, the slit 10 and the convex line 11 are not formed at the four corners of the casing 3.

EXAMPLE 2

Next, FIGS. 7(A)-7(D) show a plan view, respective sectional views, and a perspective view of an essential part of the seal material 5 used for another type of seal structure of the present invention. FIG. 8 is a perspective view of the seal structure and all the components except the seal material 5 are the same as those described in the above example.

In this example also, the both end parts of the casing 3 are fitted with a pair of tank receivers 9, where the annular grooves 4 are formed inside the open end of the casing 3.

Figure 7A:
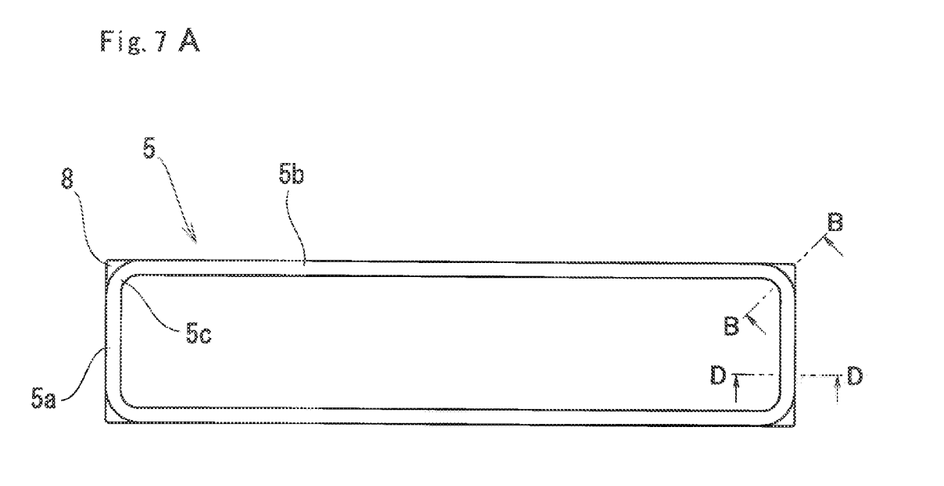
FIG. 7(A) is a plan view.
Figure 7B:
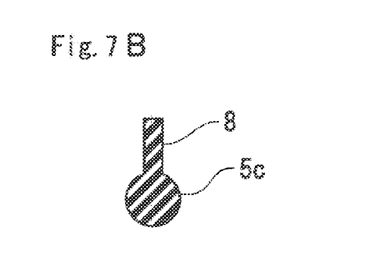
FIG. 7(B) is a sectional view taken along line B-B of FIG. 7(A)
Figure 7C:
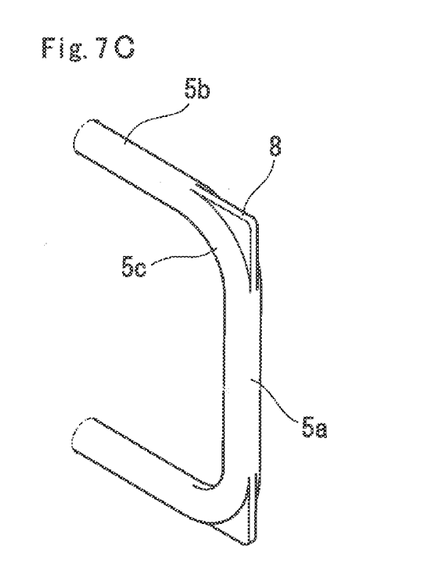
FIG. 7(C) is a perspective view of an essential part.

As shown in FIG. 7(A), the seal material 5 has a pair of short-side parts 5a and a pair of long-side parts 5b. The cross section of each of those short-side parts 5a and the long-side parts 5b is formed in a circular shape in cross section as shown in FIG. 7(D), FIGS. 7(B) and 7(C), each base part 5c for connecting the short-side part 5a and a protruding flange part 8 is integrally formed with the long-side part 5b.

Figure 9A:
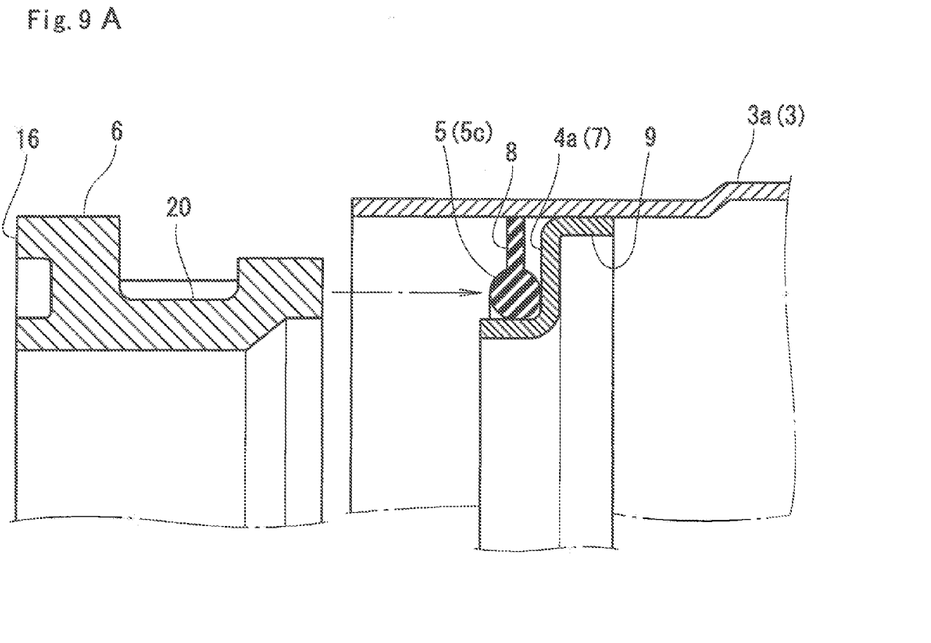
FIG. 9 shows vertical sectional views of the same seal structure at the four corners representing the states before and after assembling, respectively.

Further, as shown in FIG. 9(A), at the four corner sections of the annular groove 4, the flange parts 8 of the seal material 5 are inserted into the respective four corner sections 7 of the annular groove 4.

Figure 7D:
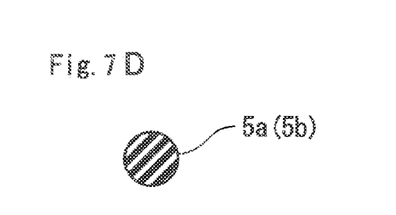
FIG. 7(D) is a view taken along line D-D of FIG. 7(A).
Figure 8:
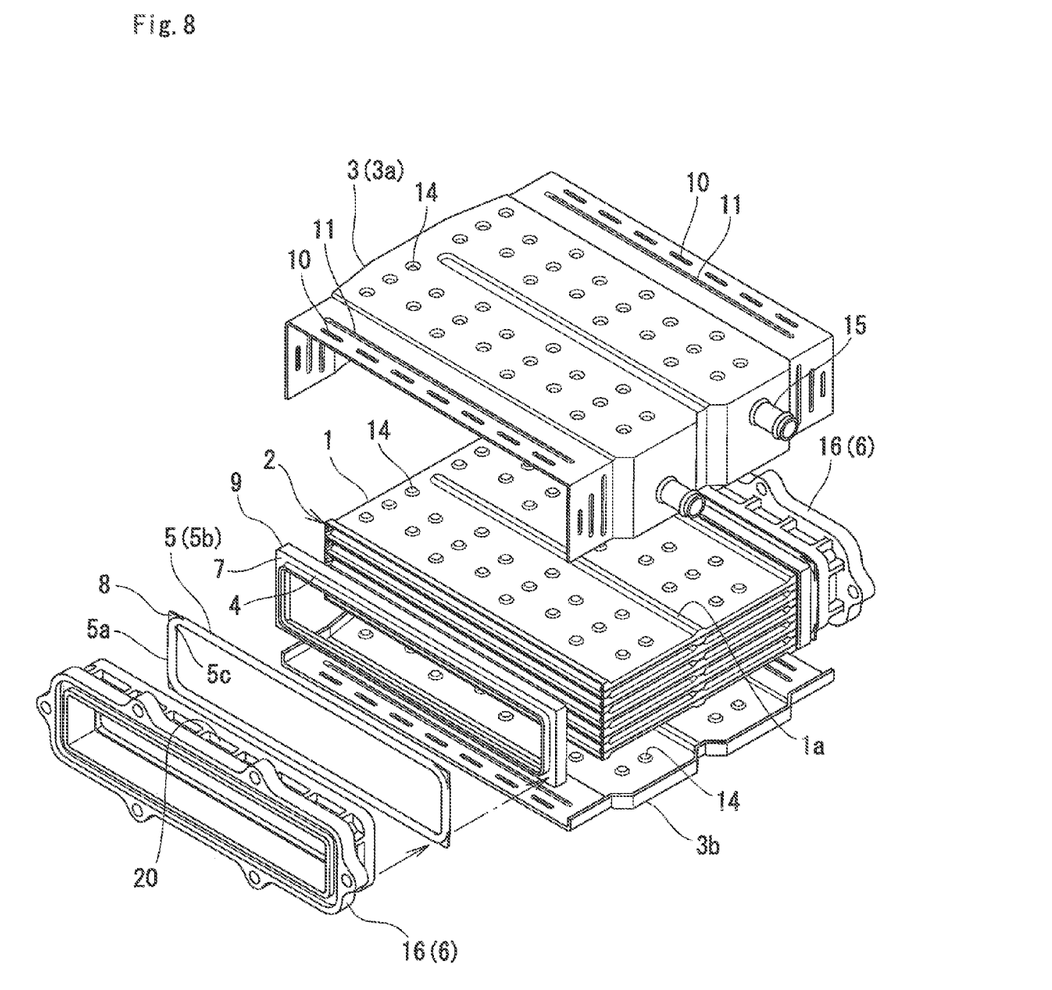
FIG. 8 is an exploded perspective view of the seal structure.

Moreover, the seal material 5 is circular in cross section at the position other than that at the corner section 7 of the annular groove 4 (FIG. 7D).

Next, the tank 6 has a large number of concave parts 20 in the outer periphery arranged in parallel like windows as shown in FIGS. 1 and 8, the end part of the casing 3 is press fitted with the concave part 20 to be swaged as shown in FIG. 3. The four corners of the casing 3 are not swaged. It is because of the complicated process.

Figure 11:
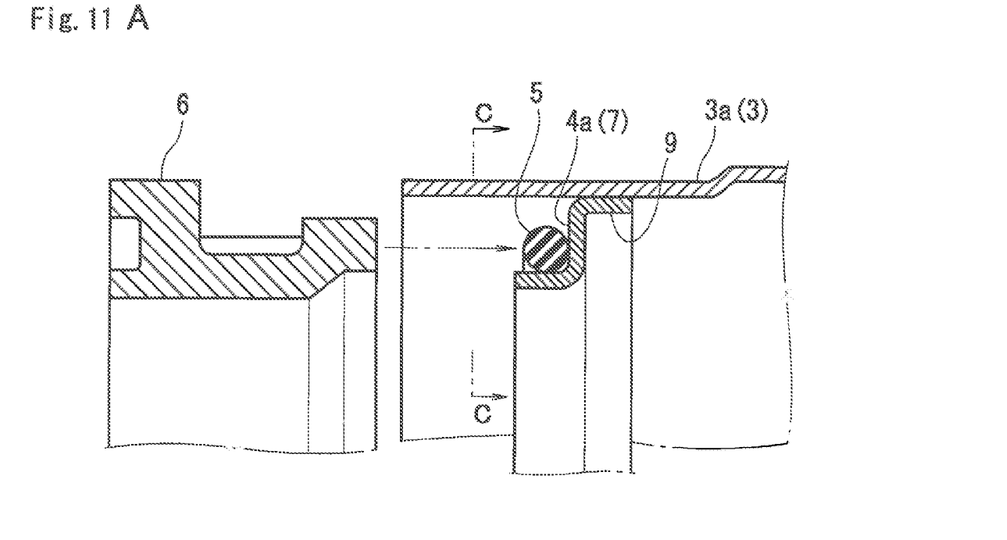
FIGS. 11(A) and 11(B) are explanatory views of assembling with respect to disadvantage of the generally employed seal material.
FIG. 11(C) is a sectional view taken along line C-C of FIG. 11(A).

Each of the four corner sections 7 is wider than the other part (see FIG. 11(C)). The tank receiver 9 is formed by processing the metal plate having the outer frame bent into the rectangular planar shape, the inner peripheral frame press molded to have a rising part like a rib.

Therefore, the rising corner section is formed in an arc shape, that is, the corner section 7 of the annular groove 4 is formed in a fan-shape. Accordingly, the annular groove 4 has a wide part 4a broad at the corner section 7, and a narrow part at the other section.

Figure 9B:
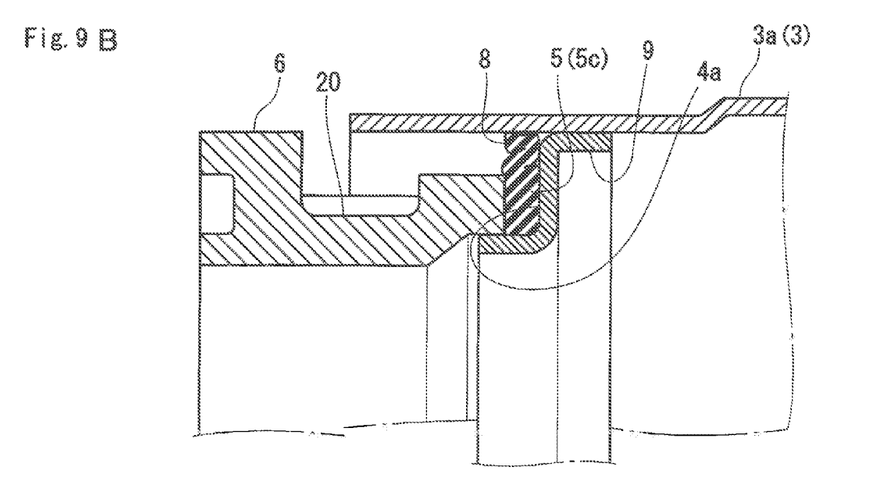

The seal material 5 for the seal structure of the present invention has the flange parts 8 formed at the respective four corners, and the end part of the flange part 8 is in pressure contact with the inner surface of the casing 3 as shown in FIGS. 9(A) and 9(B) to position the seal material 5 at the corner sections 7 of the annular groove 4. Therefore, even in the case where a gap is generated between the inner surface and the end part of the tank 6 at the corner of the casing 3 as shown in FIG. 9(B), the seal material 5 is not off from the corner section 7 of the annular groove 4. This just makes it possible to prevent movement of the seal material within the annular groove 4 as shown in FIGS. 11(A) and 11(B). Therefore, the sealing performance at the corner sections 7 of the annular groove 4 is improved.

Such as the constructed heat exchanger, a not shown duct is connected to a flange 16 of the tank 6 with the seal material, where gas 18 circulating inside the respective flat tubes 1 of the core 2 and liquid 19 circulating through the outer periphery, and heat exchange occurs.

EXAMPLE 3

Figure 10:
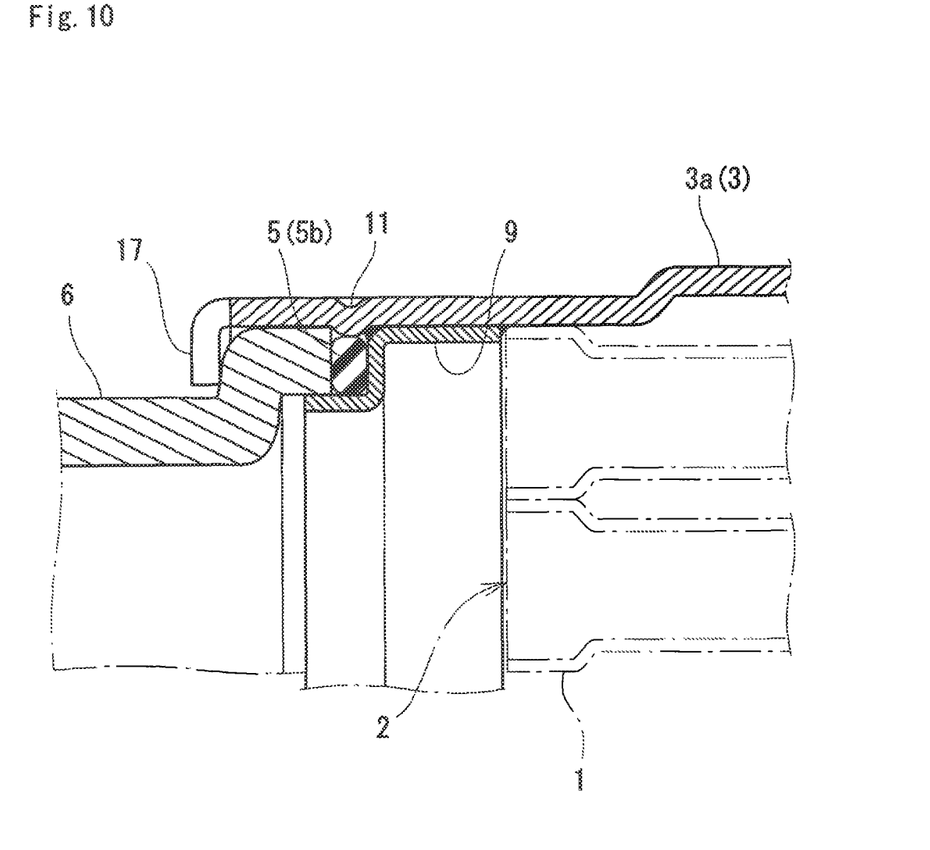
FIG. 10 is a sectional view of the seal structure as another embodiment.

FIG. 10 shows another example of the present invention, which is different from the examples as described above in the swaging process and the tank shape. In the example as described above, the swaged parts 17 are formed by pressing the leading ends from the slits 10, in place of this, the hooks are formed in the respective edges of both open ends of the casing 3 at predetermined intervals, where the hook is bent to the outer wall side of the tank to form the swaged part 17.

Note that the swaging method for securing the tank is not limited to those described above.

Further, the tank shape is not specifically limited as well. This example employs the tank shaped like long lunch box having one open end.

The invention claimed is:

1. A seal structure for a tank comprising:
a core formed from a lamination of a plurality of flat tubes where a cross section of an outer periphery at an end part is formed into a rectangular shape;
a casing fitted onto the outer periphery of the core, having a rectangular opening at the end part;
a tank receiver positioned in alignment with an inner periphery of the open end part of the casing, formed in a planar frame shape and crank-shaped in cross section;
an annular groove formed between the tank receiver and the casing; and
a tank having an end part press fitted inside the annular groove with a seal material, having an outer periphery swaged and thereby secured, and wherein the annular groove is formed by a first arm of the crank-shaped cross section orthogonal to an axis of the tank receiver and a second arm of the crank-shaped cross section parallel to the axis of the tank receiver and extending from the first arm into the end part of the tank.

2. The seal structure according to claim 1, wherein:
a plurality of concave parts is arranged in parallel like windows in the outer periphery of the tank, and slits are formed in an outer periphery of the open end part of the casing at predetermined intervals wherein the open end sides are pressed from the slits of the casing to the concave parts in parallel; and wherein
the outer periphery of the tank is swaged and thereby secured.

3. The seal structure according to claim 1, wherein:
the annular groove has corner sections each being made wider than other parts, and curved to have an arc shape at four corners each having a substantially rectangular shape;
the seal material has
a pair of short-side parts,
a pair of long-side parts in parallel with each other, base parts circular in cross section, formed at the four corners, and
flange parts each having a planar fan-like shape, integrally formed with the base parts, the flange parts protruded outward of the respective four corners;
the seal material is configured to fit the base parts and the flange parts inside the annular groove at the four corners; and
the tank is press fitted inside the annular groove of the casing with the seal material, which is swaged and thereby secured.

4. The seal structure according to claim 3, wherein:
the tank is swaged and thereby secured from outside the casing except the corner sections of the annular groove of the casing.

5. The seal structure according to claim 3, wherein:
the tank is swaged and thereby secured to the annular groove from outside the casing by bending a plurality of hooks formed on the casing at right angles directed to the tank side.

6. The seal structure according to claim 2, wherein:
the annular groove has corner sections each being made wider than other parts, and curved to have an arc shape at four corners each having a substantially rectangular shape;
the seal material has
a pair of short-side parts,
a pair of long-side parts in parallel with each other, base parts circular in cross section, formed at the four corners, and
flange parts each having a planar fan-like shape, integrally formed with the base parts, the flange parts protruded outward of the respective four corners;
the seal material is configured to fit the base parts and the flange parts inside the annular groove at the four corners; and
the tank is press fitted inside the annular groove of the casing with the seal material, which is swaged and thereby secured.

7. The seal structure according to claim 6, wherein:
the tank is swaged and thereby secured from outside the casing except the corner sections of the annular groove of the casing.

\* \* \* \* \*